US012629915B2

(12) United States Patent
Liao et al.

(10) Patent No.: US 12,629,915 B2
(45) Date of Patent: May 19, 2026

(54) FIREPROOF MATERIAL USED FOR LITHIUM BATTERY MODULE AND METHOD FOR PRODUCING THE SAME

(71) Applicant: NAN YA PLASTICS CORPORATION, Taipei (TW)

(72) Inventors: Te-Chao Liao, Taipei (TW); Shiou-Yeh Sheng, Taipei (TW); Chao-Hsien Lin, Taipei (TW); Yun-Bin Hsi, Taipei (TW); Ching-Yao Yuan, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 244 days.

(21) Appl. No.: 18/451,817

(22) Filed: Aug. 17, 2023

(65) Prior Publication Data

US 2024/0399702 A1 Dec. 5, 2024

(30) Foreign Application Priority Data

May 29, 2023 (TW) ................................... 112119811

(51) Int. Cl.
*B32B 5/06* (2006.01)
*A62C 2/06* (2006.01)
(Continued)

(52) U.S. Cl.
CPC ................ *B32B 5/073* (2021.05); *A62C 2/06* (2013.01); *B32B 5/024* (2013.01); *B32B 37/18* (2013.01);
(Continued)

(58) Field of Classification Search
CPC .......... B32B 2038/008; B32B 2250/05; B32B 2250/20; B32B 2262/105;
(Continued)

(56) References Cited

U.S. PATENT DOCUMENTS

| | | | | |
|---|---|---|---|---|
| 4,750,443 | A | * | 6/1988 | Blaustein .................. B32B 5/26 428/920 |
| 2021/0163303 | A1 | * | 6/2021 | Evans ..................... B32B 5/024 |
| 2022/0298312 | A1 | | 9/2022 | Bartel et al. |

FOREIGN PATENT DOCUMENTS

| | | |
|---|---|---|
| CN | 110884233 A | 3/2020 |
| CN | 112959759 A | 6/2021 |

(Continued)

*Primary Examiner* — Alicia J Weydemeyer
(74) *Attorney, Agent, or Firm* — Li & Cai Intellectual Property Office

(57) ABSTRACT

A fireproof material used for a lithium battery module and a method for producing the same are provided. The fireproof material has a stacked structure formed by stacking multiple layers of mesh structures. Each layer of the mesh structures includes a plurality of first fibers and a plurality of second fibers. The first fibers are oxidized fibers, and the second fibers are silicate fibers. Each layer of the mesh structures is formed by interweaving the plurality of first fibers and the plurality of second fibers. The multiple layers of the mesh structures of the fireproof material have a stacked layer number of between 5 layers and 20 layers and a stacked layer thickness of between 0.3 mm and 5 mm. The fireproof material has a density of between 0.05 g/cm³ and 2 g/cm³ and a thermal conductivity of between 0.01 W/(m·K) and 0.8 W/(m·K).

3 Claims, 4 Drawing Sheets

(51) Int. Cl.

| | |
|---|---|
| *B32B 5/02* | (2006.01) |
| *B32B 37/18* | (2006.01) |
| *B32B 38/00* | (2006.01) |
| *D01G 9/00* | (2006.01) |
| *D01G 13/00* | (2006.01) |
| *D03D 1/00* | (2006.01) |
| *D03D 9/00* | (2006.01) |
| *D03D 15/242* | (2021.01) |
| *D06C 7/00* | (2006.01) |
| *D06C 15/00* | (2006.01) |
| *H01M 10/658* | (2014.01) |

(52) U.S. Cl.
CPC ............... *D01G 9/00* (2013.01); *D01G 13/00* (2013.01); *D03D 1/00* (2013.01); *D03D 9/00* (2013.01); *D03D 15/242* (2021.01); *D06C 7/00* (2013.01); *D06C 15/00* (2013.01); *H01M 10/658* (2015.04); *B32B 2038/008* (2013.01); *B32B 2250/05* (2013.01); *B32B 2250/20* (2013.01); *B32B 2262/105* (2013.01); *B32B 2262/148* (2021.05); *B32B 2262/16* (2021.05); *B32B 2305/188* (2013.01); *B32B 2307/302* (2013.01); *B32B 2307/3065* (2013.01); *B32B 2307/72* (2013.01); *B32B 2307/7376* (2023.05); *B32B 2315/02* (2013.01); *B32B 2457/10* (2013.01); *D10B 2101/08* (2013.01); *D10B 2401/04* (2013.01); *D10B 2505/00* (2013.01)

(58) Field of Classification Search
CPC .......... B32B 2262/148; B32B 2262/16; B32B 2305/188; B32B 2307/302; B32B 2307/3065; B32B 2307/72; B32B 2307/7376; B32B 2315/02; B32B 2457/10; B32B 37/18; B32B 5/024; B32B 5/06; B32B 5/073; B32B 5/08; B32B 5/263; B32B 7/027; D03D 1/00; D03D 15/242; D03D 9/00; H01M 10/658; A62C 2/06; A62C 2/10; A62C 2/00; D10B 2101/08

See application file for complete search history.

(56) References Cited

FOREIGN PATENT DOCUMENTS

| | | | | | |
|---|---|---|---|---|---|
| CN | 115107338 | A | * | 9/2022 | ............... B32B 5/02 |
| WO | WO2023284272 | A1 | | 1/2023 | |

* cited by examiner

100a 2a 1a

100

2 1

100

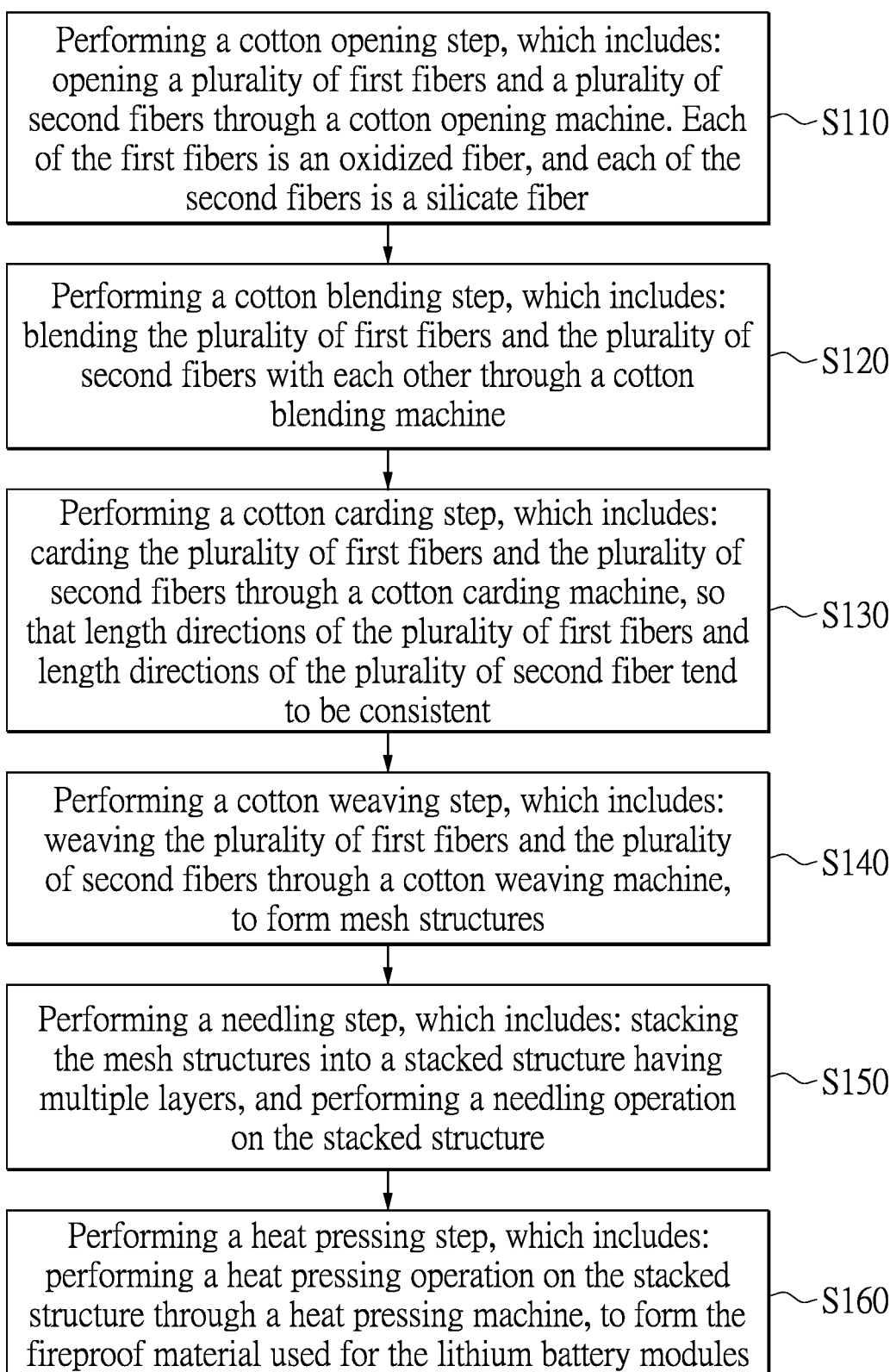

Performing a cotton opening step, which includes: opening a plurality of first fibers and a plurality of second fibers through a cotton opening machine. Each of the first fibers is an oxidized fiber, and each of the second fibers is a silicate fiber —S110

Performing a cotton blending step, which includes: blending the plurality of first fibers and the plurality of second fibers with each other through a cotton blending machine —S120

Performing a cotton carding step, which includes: carding the plurality of first fibers and the plurality of second fibers through a cotton carding machine, so that length directions of the plurality of first fibers and length directions of the plurality of second fiber tend to be consistent —S130

Performing a cotton weaving step, which includes: weaving the plurality of first fibers and the plurality of second fibers through a cotton weaving machine, to form mesh structures —S140

Performing a needling step, which includes: stacking the mesh structures into a stacked structure having multiple layers, and performing a needling operation on the stacked structure —S150

Performing a heat pressing step, which includes: performing a heat pressing operation on the stacked structure through a heat pressing machine, to form the fireproof material used for the lithium battery modules —S160

FIG. 5

FIREPROOF MATERIAL USED FOR LITHIUM BATTERY MODULE AND METHOD FOR PRODUCING THE SAME

CROSS-REFERENCE TO RELATED PATENT APPLICATION

This application claims the benefit of priority to Taiwan Patent Application No. 112119811, filed on May 29, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a fireproof material, and more particularly to a fireproof material used for a lithium battery module and a method for producing the same.

BACKGROUND OF THE DISCLOSURE

In the related art, as shown in FIG. 1, a conventional fireproof material 100a is mostly formed by adding inorganic powder 1a into a polymer resin 2a for application in a lithium battery module. Since the conventional fireproof material 100a contains the polymer resin 2a, the conventional fireproof material 100a cannot withstand a temperature higher than 400° C.

In order to improve fire resistance, the conventional fireproof material needs to be filled with a large amount of the inorganic powders and be increased in thickness. As a result, its material density and weight per unit area are too high to satisfy the lightweight design for fulfilling market demand. Meanwhile, the conventional fireproof material is a rigid plate that cannot be bent, which limits the applicable types of end products.

The factors mentioned above are not conducive to the recent demands for fireproof material, which includes being fire-resistant, being lightweight, being space-efficient, allowing for rapid production, and meeting assembly requirements of end customers for lithium battery modules having different shapes.

SUMMARY OF THE DISCLOSURE

In response to the above-referenced technical inadequacies, the present disclosure provides a fireproof material used for a lithium battery module and a method for producing the same.

In order to solve the above-mentioned problems, one of the technical aspects adopted by the present disclosure is to provide a fireproof material used for a lithium battery module. The fireproof material has a stacked structure formed by stacking multiple layers of mesh structures, and each layer of the mesh structures includes a first fibrous material and a second fibrous material. The first fibrous material includes a plurality of first fibers, and each of the first fibers is an oxidized fiber. The second fibrous material includes a plurality of second fibers, and each of the second fibers is a silicate fiber. Each layer of the mesh structures is formed by interweaving the plurality of first fibers and the plurality of second fibers. The multiple layers of the mesh structures of the fireproof material have a stacked layer number of between 5 layers and 20 layers, and a stacked layer thickness of between 0.3 mm and 5 mm. The fireproof material has an overall density of between 0.05 $g/cm^3$ and 2 $g/cm^3$ and an overall thermal conductivity of between 0.01 W/(m·K) and 0.8 W/(m·K).

In one of the possible or preferred embodiments, each of the first fibers has a first refractory temperature of between 700° C. and 1,000° C. and a first thermal conductivity of between 0.02 W/(m·K) and 0.45 W/(m·K). Each of the second fibers has a second refractory temperature of between 900° C. and 1,100° C. and a second thermal conductivity of between 0.02 W/(m·K) and 0.5 W/(m·K).

In one of the possible or preferred embodiments, each of the first fibers has a first fiber length of between 45 micrometers and 120 micrometers and a first fiber diameter of between 1 micrometer and 15 micrometers. Each of the second fibers has a second fiber length of between 50 micrometers and 75 micrometers and a second fiber diameter of between 8 micrometers and 14 micrometers.

In one of the possible or preferred embodiments, based on a total weight of the fireproof material being 100 parts by weight, an amount of the first fibrous material is between 30 parts by weight and 70 parts by weight, and an amount of the second fibrous material is between 30 parts by weight and 70 parts by weight.

In one of the possible or preferred embodiments, the multiple layers of the mesh structures of the fireproof material have the stacked layer number of between 8 layers and 16 layers, and the stacked layer thickness of between 0.5 mm and 4 mm.

In one of the possible or preferred embodiments, the fireproof material has the overall density of between 0.1 $g/cm^3$ and 1.2 $g/cm^3$ and the overall thermal conductivity of between 0.03 W/(m·K) and 0.5 W/(m·K).

In order to solve the above-mentioned problems, another one of the technical aspects adopted by the present disclosure is to provide a method for producing a fireproof material used for a lithium battery module. The method includes a cotton opening step, a cotton blending step, a cotton carding step, a cotton weaving step, a needling step, and a heat pressing step.

The cotton opening step includes: opening a plurality of first fibers and a plurality of second fibers through a cotton opening machine. Each of the first fibers is an oxidized fiber, and each of the second fibers is a silicate fiber. The cotton blending step includes: blending the plurality of first fibers and the plurality of second fibers with each other through a cotton blending machine. The cotton carding step includes: carding the plurality of first fibers and the plurality of second fibers through a cotton carding machine, so that length directions of the plurality of first fibers and length directions of the plurality of second fibers tend to be consistent. The cotton weaving step includes: weaving the plurality of first fibers and the plurality of second fibers through a cotton weaving machine, so as to form mesh structures. The needling step includes: stacking the mesh structures into a stacked structure having multiple layers, and performing a needling operation on the stacked structure. The heat pressing step includes: performing a heat pressing operation on the stacked structure through a heat pressing machine, so as to form the fireproof material used for the lithium battery module.

The multiple layers of the mesh structures of the fireproof material has a stacked layer number of between 5 layers and 20 layers and a stacked layer thickness of between 0.3 mm and 5 mm. The fireproof material has an overall density of between 0.05 g/cm³ and 2 g/cm³ and an overall thermal conductivity of between 0.01 W/(m·K) and 0.8 W/(m·K).

In one of the possible or preferred embodiments, in the cotton carding step, the cotton carding machine is to card the plurality of first fibers and the plurality of second fibers through a card clothing roll of the cotton carding machine.

In one of the possible or preferred embodiments, in the cotton carding step, a needle pitch between any two adjacent needles among a plurality of needles arranged on the card clothing roll is between 0.1 micrometers and 300 micrometers.

In one of the possible or preferred embodiments, in the needling step, a needle density of the needling operation on the stacked structure is between 400 needles per inch and 1,800 needles per inch.

In one of the possible or preferred embodiments, in the heat pressing step, a heat pressing temperature of the heat pressing operation is between 180° C. and 240° C.

Therefore, in the fireproof material used for the lithium battery module and the method for producing the same provided by the present disclosure, by virtue of "the first fibers (oxidized fibers) and the second fibers (silicate fibers) of the mesh structures" and "the specific stacked structure," the fireproof material can not only have high fire resistance, but also have lightweight properties, bendability, thinness, cushioning and vibration reduction, compressibility, no toxicity, no peculiar smell, and a low thermal conductivity. Accordingly, the fireproof material is suitable for use in the lithium battery module, especially in terminal fields for energy storage and power applications. In addition, the fireproof material can be quickly mass-produced through a roll-to-roll process, and thus has the advantage of low production costs.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 5 is a flow chart of a method for producing the fireproof material according to the embodiment of the present disclosure.

DETAILED DESCRIPTION OF THE EXEMPLARY EMBODIMENTS

Figure 1:
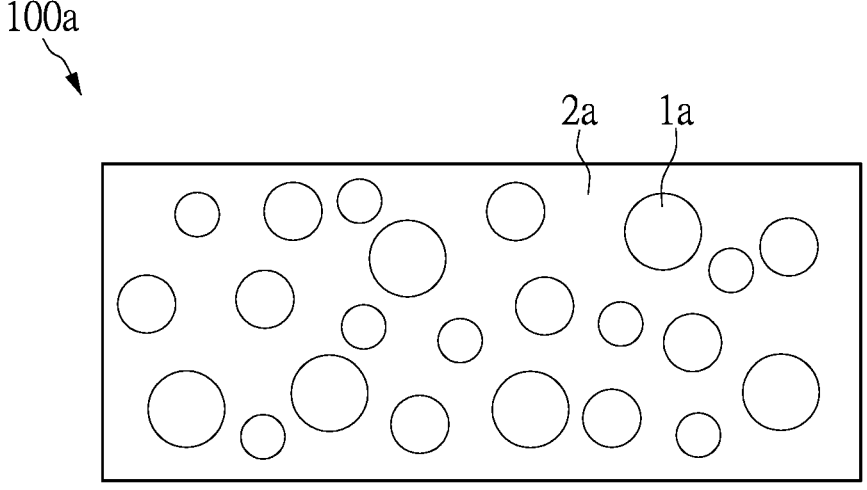
FIG. 1 is a schematic view of a conventional fireproof material in the related art.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various materials, parameters or the like, which are for distinguishing one component/signal from another one only, and are not intended to, nor should be construed to impose any substantive limitations on the components, signals or the like.

[Fireproof Material Used for Lithium Battery Module]

Figure 2:
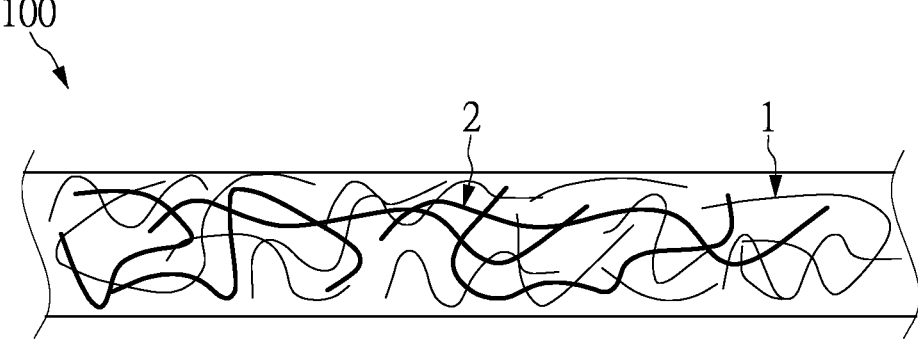
FIG. 2 is a schematic side view of a mesh structure of a fireproof material according to an embodiment of the present disclosure.
Figure 3:
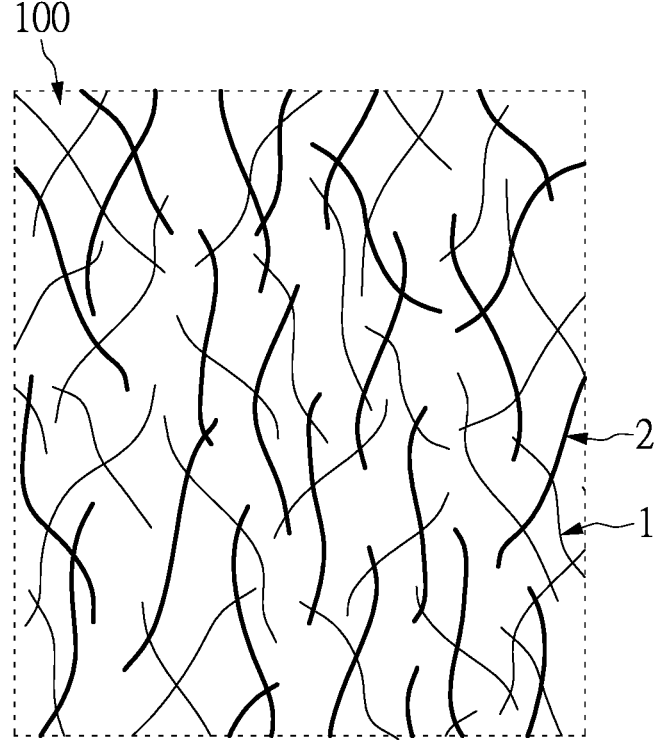
FIG. 3 is a schematic top view of the mesh structure of the fireproof material according to the embodiment of the present disclosure.

Referring to FIG. 2 and FIG. 3, an embodiment of the present disclosure provides a fireproof material 100 used for a lithium battery module. The fireproof material 100 includes a first fibrous material 1 and a second fibrous material 2. The first fibrous material 1 includes a plurality of first fibers, and the second fibrous material 2 includes a plurality of second fibers.

The plurality of first fibers and the plurality of second fibers are interwoven with each other to form a mesh structure as shown in FIG. 3.

Each of the first fibers is an oxidized fiber, which can be an oxidized poly-acrylonitrile fiber (i.e., oxidized PAN fiber), but the present disclosure is not limited thereto.

Each of the first fibers (oxidized fibers) has a first refractory temperature of between 700° C. and 1,000° C., and preferably between 800° C. and 900° C. Each of the first fibers (oxidized fibers) has a first thermal conductivity of between 0.02 W/(m·K) and 0.45 W/(m·K), and preferably between 0.14 W/(m·K) and 0.2 W/(m·K).

Furthermore, each of the first fibers (oxidized fibers) has a first fiber length of between 45 micrometers and 120 micrometers, preferably between 45 micrometers and 60 micrometers, and more preferably between 45 micrometers and 55 micrometers.

In addition, each of the first fibers (oxidized fibers) has a first fiber diameter of between 1 micrometer and 15 micrometers, preferably between 1 micrometer and 5 micrometers, and more preferably between 1 micrometer and 3 micrometers.

Each of the second fibers is a silicate fiber, and is preferably an aluminum silicate fiber.

Each of the second fibers (silicate fibers) has a second refractory temperature of between 900° C. and 1,100° C., and preferably between 950° C. and 1,050° C. Each of the second fibers (silicate fibers) has a second thermal conductivity of between 0.02 W/(m·K) and 0.5 W/(m·K), and preferably between 0.03 W/(m·K) and 0.4 W/(m·K).

Furthermore, each of the second fibers (silicate fibers) has a second fiber length of between 50 micrometers and 75 micrometers, and preferably between 52 micrometers and 67 micrometers. Each of the second fibers (silicate fibers) has a second fiber diameter of between 8 micrometers and 14 micrometers, and preferably between 8 micrometers and 12 micrometers.

In terms of usage amount, based on a total weight of the fireproof material 100 being 100 parts by weight, an amount of the first fibrous material 1 (oxidized fibers) is between 30 parts by weight and 70 parts by weight (preferably between 45 parts by weight and 60 parts by weight), and an amount of the second fibrous material 2 (silicate fibers) is between 30 parts by weight and 70 parts by weight (preferably between 35 parts by weight and 45 parts by weight).

According to the above configuration, the first fibers (oxidized fibers) are configured to provide cloth support strength and basic fire resistance required by the fireproof material 100, and the second fibers (silicate fibers) are configured to further strengthen the fire resistance of the fireproof material 100.

Figure 4:
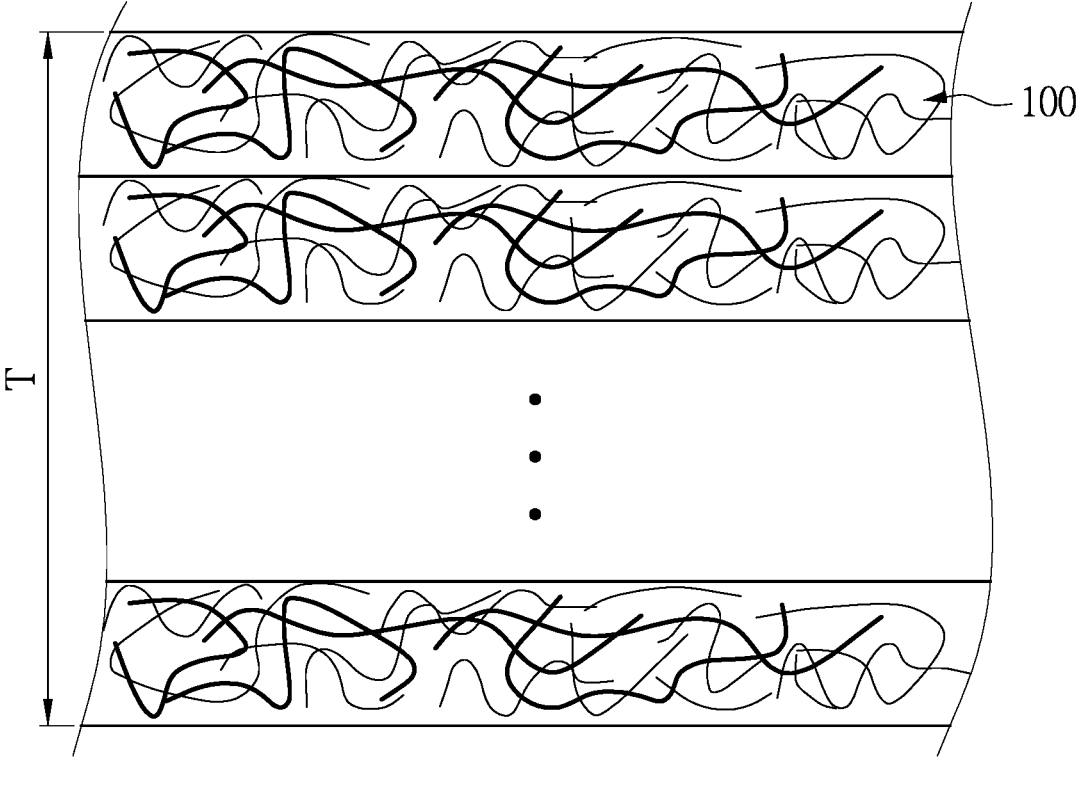
FIG. 4 is a schematic side view of a stacked structure of the fireproof material having multiple layers of mesh structures according to the embodiment of the present disclosure.

In one particular embodiment of the present disclosure, as shown in FIG. 4, the mesh structure formed by the plurality of first fibers and the plurality of second fibers can be further stacked with other mesh structures to form a stacked structure having multiple layers of the mesh structures. That is, the fireproof material 100 has the multiple layers of the mesh structures stacked on each other. Each layer of the mesh structures is formed by the plurality of first fibers and the plurality of second fibers interwoven with each other. The stacked structure can be formed by bending and stacking one mesh structure having a long length and a continuous shape, but the present disclosure is not limited thereto.

In addition, the fireproof material 100 having the multiple layers of the mesh structures stacked on each other has a stacked layer number of between 5 layers and 20 layers, and preferably between 8 layers and 16 layers. Furthermore, the fireproof material 100 has a stacked layer thickness T of between 0.3 mm and 5 mm, and preferably between 0.5 mm and 4 mm.

Overall, the fireproof material 100 formed by the first fibrous material 1 and the second fibrous material 2 has an overall density of between 0.05 g/cm³ and 2 g/cm³, and preferably between 0.1 g/cm³ and 1.2 g/cm³. The fireproof material 100 has an overall thermal conductivity of between 0.01 W/(m·K) and 0.8 W/(m·K), and preferably between 0.03 W/(m·K) and 0.5 W/(m·K).

According to the above configuration, the fireproof material 100 provided in the embodiment of the present disclosure can not only have high fire resistance, but also have lightweight properties, thinness, bendability, cushioning and vibration reduction, compressibility, no toxicity, no peculiar smell, and a low thermal conductivity. Accordingly, the fireproof material 100 is suitable for use in the lithium battery module, especially in terminal fields for energy storage and power applications.

In addition, the fireproof material 100 provided by the embodiment of the present disclosure can be quickly mass-produced through a roll-to-roll process, and thus has the advantage of low production costs.

It is worth mentioning that the "thermal conductivity" or "K value" mentioned in the present disclosure refers to the ability of any uniform material to directly conduct heat. A material having a K value of 1 means that 1 cubic meter of the material will transfer heat at a rate of 1 watt when a temperature difference between two surfaces of the material is 1 Celsius degree. That is, the K value is 1 W/(m·K). When the K value of the material is low, the material is less capable of transferring heat.

In addition, the "refractory temperature" mentioned in the present disclosure refers to a temperature at which the material reaches a certain degree of softening or is ignited due to the action of high temperature, and characterizes the performance of the material against the high temperature. For example, the refractory temperature can be determined by adopting the international standard test method of GB/T7322-1997 (ISO 528:1983), i.e., "Test Method for Pyrometric Cone Equivalent (Refractoriness) of Refractories", but the present disclosure is not limited thereto.

It is worth mentioning that, in one exemplary embodiment of the present disclosure, the fireproof material 100 further includes a third fibrous material (not shown in the drawings) interwoven with the first fibrous material 1 and the second fibrous material 2 for formation of the mesh structures. The third fibrous material includes a plurality of third fibers, and each of the third fibers is a ceramic fiber.

Each of the third fibers (ceramic fibers) has a third refractory temperature of between 1,000° C. and 1,200° C., and preferably between 1,050° C. and 1,150° C. Each of the third fibers (ceramic fibers) has a third thermal conductivity of between 0.02 W/(m·K) and 0.5 W/(m·K), and preferably between 0.05 W/(m·K) and 0.5 W/(m·K). Furthermore, each of the third fibers (ceramic fibers) has a third fiber length of between 30 micrometers and 60 micrometers, preferably between 45 micrometers and 55 micrometers, and more preferably between 45 micrometers and 52 micrometers. In addition, each of the third fibers (ceramic fibers) has a third fiber diameter of between 10 micrometers and 16 micrometers, preferably between 10 micrometers and 14 micrometers, and more preferably between 11 micrometers and 13 micrometers. In terms of usage amount, based on the total weight of the fireproof material being 100 parts by weight, an amount of the third fibrous material (ceramic fibers) is between 1 part by weight and 20 parts by weight, preferably between 3 parts by weight and 18 parts by weight, and more preferably between 5 parts by weight and 10 parts by weight. The third fibrous material (ceramic fibers) can further provide an effect of reinforcing fire resistance.

[Method for Producing Fireproof Material Used for Lithium Battery Module]

The above descriptions illustrate material characteristics of the fireproof material used for the lithium battery module according to the embodiment of the present disclosure. As shown in FIG. 5, an embodiment of the present disclosure further provides a method for producing the fireproof material used for the lithium battery module. The method includes step S110 (a cotton opening step), step S120 (a cotton blending step), step S130 (a cotton carding step), step S140 (a cotton weaving step), step S150 (a needling step), and step S160 (a heat pressing step).

It should be noted that step sequences and actual operation manners described in the present embodiment can be adjusted according to practical requirements, and the present disclosure is not limited to those described in the embodiment. The method described in the embodiment of the present disclosure can include additional operations before, during, or after each step. Some of the operations described can be replaced, removed, or rearranged to achieve additional embodiments.

Step S110 is to perform a cotton opening step. The cotton opening step includes opening a plurality of first fibers (oxidized fibers) of a first fibrous material 1 and a plurality of second fibers (silicate fibers) of a second fibrous material 2 through a cotton opening machine, so that the plurality of first fibers and the plurality of second fibers are in a uniformly loose and fluffy state.

Step S120 is to perform a cotton blending step. The cotton blending step includes blending the plurality of first fibers (oxidized fibers) and the plurality of second fibers (silicate fibers) that have been opened through a cotton blending machine.

Step S130 is to perform a cotton carding step. The cotton carding step includes carding the plurality of first fibers (oxidized fibers) and the plurality of second fibers (silicate fibers) that have been blended with each other through a cotton carding machine, so that length directions of the plurality of first fibers and length directions of the plurality of second fibers tend to be consistent (as shown in FIG. 3).

It is worth mentioning that, in one exemplary embodiment of the present disclosure, the cotton carding machine in step S130 is to card the plurality of first fibers (oxidized fibers) and the plurality of second fibers (silicate fibers) through a card clothing roll of the cotton carding machine.

In the cotton carding step, a needle pitch between any two adjacent needles among a plurality of needles arranged on the card clothing roll needs to be between 0.1 micrometers and 300 micrometers, and is preferably between 10 micrometers and 30 micrometers, and more preferably between 15 micrometers and 22 micrometers.

Step S140 is to perform a cotton weaving step. The cotton weaving step includes weaving the plurality of first fibers (oxidized fibers) and the plurality of second fibers (silicate fibers) that have been carded through a cotton weaving machine, to form continuous mesh structures. In one embodiment of the present disclosure, the cotton weaving machine can be, for example, an air jet loom, but the present disclosure is not limited thereto.

It is worth mentioning that, since the needle pitch between any two adjacent ones of the needles arranged on the card clothing roll is specially adjusted in step S130, the plurality of first fibers (oxidized fibers) and the plurality of second fibers (silicate fibers) carded by the cotton carding machine can be easily formed into the continuous mesh structures by the cotton weaving machine (e.g., the air jet loom). Furthermore, the fibers will not fall between rollers in the cotton weaving machine, but the present disclosure is not limited thereto.

If the needle pitch exceeds the above-mentioned range, the fibers may not be easily weaved to form the continuous mesh structures, or the fibers may easily fall between the rollers in the cotton weaving machine.

Step S150 is to perform a needling step. The needling step includes stacking the continuous mesh structures formed from step S140 into a stacked structure having a stacked layer number of between 5 layers and 20 layers, and preferably between 8 layers and 16 layers.

The needling step further includes performing a needling operation on the stacked structure. A needle density of the needling operation on the stacked structure is between 400 needles per inch and 1,800 needles per inch, and preferably between 400 needles per inch and 600 needles per inch, so that the stacked structure can ideally have an overall density of between 0.05 g/cm$^3$ and 2 g/cm$^3$, a stacked layer thickness of between 0.3 mm and 5 mm, and a thermal conductivity of between 0.01 W/(m·K) and 0.8 W/(m·K).

Step S160 is to perform a heat pressing step. The heat pressing step includes performing a heat pressing operation on the stacked structure that has been needled through a heat pressing machine, so as to form the fireproof material 100 used for the lithium battery module.

In the heat pressing step, a heat pressing temperature of the heat pressing operation is between 180° C. and 240° C.

According to the above configuration, the fireproof material 100 provided in the embodiment of the present disclosure can not only have high fire resistance, but also have lightweight properties, thinness, bendability, cushioning and vibration reduction, compressibility, no toxicity, no peculiar smell, and a low thermal conductivity. Accordingly, the fireproof material 100 is suitable for use in the lithium battery module, especially in terminal fields for energy storage and power applications.

Preferably, the above method for producing the fireproof material can also include treating the third fibers (i.e., ceramic fibers) at the same time.

[Experimental Data and Test Results]

In order to prove the technical effects of the fireproof material used for the lithium battery module and the method for producing the same provided by the present disclosure, experimental data and experimental results will be used for illustrative purposes. However, the following exemplary embodiments and comparative embodiments are only provided for the convenience of understanding the present disclosure, and the scope of the present disclosure is not limited thereto.

The preparation method of Exemplary Embodiment 1 is to open a plurality of oxidized fibers, a plurality of silicate fibers, and a plurality of ceramic fibers through a cotton opening machine according to process parameters listed in Table 1; to blend the above-mentioned fibers (i.e., the oxidized fibers, the silicate fibers, and the ceramic fibers) that have been opened through a cotton blending machine; and to card the fibers that have been blended through a cotton carding machine, so that length directions of the fibers become consistent with each other. The needle pitch between any two adjacent ones of the needles arranged on the card clothing roll is listed in Table 1.

In Exemplary Embodiment 1, the fibers that have been carded are further weaved through a cotton weaving machine, so as to form continuous mesh structures. The continuous mesh structures are stacked into a stacked structure, and a needling operation is performed on the stacked structure. The needle density of the needling operation performed on the stacked structure is listed in Table 1. Finally, a heat pressing operation is performed on the stacked structure that has been needled through a heat pressing machine, so as to form the fireproof material used for the lithium battery module.

The preparation method of each of Exemplary Embodiments 2 to 4 and Comparative Embodiments 1 to 3 is the same as that of Exemplary Embodiment 1. The differences between the above-mentioned embodiments are the process parameters, which are listed in Table 1. Comparative Embodiment 4 adopts a commercially available PU foam heat insulation material. Comparative Embodiment 5 adopts a commercially available air-gel fireproof material.

Then, experimental tests of the fireproof materials prepared in the above-mentioned exemplary embodiments and comparative embodiments are carried out for determining properties such as thickness, density, thermal conductivity (the k value), a fiber state, and refractoriness of the fireproof material, and for evaluating the fireproof materials when being used for the lithium battery module. The relevant test results are shown in Table 1.

In terms of test methods, the thickness is tested in a general way, which will not be reiterated herein. The density is tested by taking and weighing a sample of 100 square centimeters (tolerance: ±2 mm), in which the weight of the sample is X g; and by calculating a square meter weight (g/m$^2$), which is 100*(X g). The density (g/cm$^3$) equals to the square meter weight (g/m$^2$)/thickness (mm)/1000. The definitions or test methods of the thermal conductivity (the K value) and the refractoriness of the fireproof material have been described above, and will not be reiterated herein.

The test method of the fiber state is to use a stereo microscope (i.e., a dissecting microscope) for observing the fireproof material sample at a magnification of 50 times, so as to determine whether or not there is any breakage on the sample.

In the evaluation of the fireproof material when being used for the lithium battery module, the fireproof material is introduced into the lithium battery module to evaluate whether or not the lithium battery module can operate normally. If the lithium battery module can operate normally, the evaluation will be deemed as "Pass". If the lithium battery module cannot operate normally, the evaluation will be deemed as "NG".

TABLE 1

| | Items | Exemplary Embodiment 1 | Exemplary Embodiment 2 | Exemplary Embodiment 3 | Exemplary Embodiment 4 |
|---|---|---|---|---|---|
| Process parameters | material | fireproof material | fireproof material | fireproof material | fireproof material |
| | amount of oxidized fiber (g) | 50 | 50 | 45 | 60 |
| | length of oxidized fiber (μm) | 51 | 51 | 51 | 51 |
| | diameter of oxidized fiber (μm) | 2 | 2 | 2 | 2 |
| | amount of silicate fiber (g) | 40 | 45 | 45 | 35 |
| | length of silicate fiber (μm) | 52 | 52 | 67 | 67 |
| | diameter of silicate fiber (μm) | 10 | 10 | 10 | 10 |
| | amount of ceramic fiber (g) | 10 | 5 | 10 | 5 |
| | length of ceramic fiber (μm) | 52 | 52 | 48 | 45 |
| | diameter of ceramic fiber (μm) | 12 | 12 | 12 | 12 |
| | stacked layer number of mesh structures (layers) | 10 | 10 | 10 | 15 |
| | needle pitch of card clothing roll (μm) | 15 | 22 | 15 | 15 |
| | needle density (needles per inch) | 530 | 420 | 520 | 520 |
| Test Results | thickness (mm) | 0.85 | 2.0 | 1.0 | 1.0 |
| | density (g/cm$^3$) | 0.235 | 0.175 | 0.25 | 0.245 |
| | thermal conductivity (W/m · K) | 0.048 | 0.045 | 0.051 | 0.052 |
| | fiber state | no breakage | no breakage | no breakage | no breakage |
| | refractoriness of fireproof material | not burned | not burned | not burned | not burned |
| | evaluation of fireproof material when being used for lithium battery module | Pass | Pass | Pass | Pass |

TABLE 1-continued

| Items | | Comparative Embodiment 1 | Comparative Embodiment 2 | Comparative Embodiment 3 | Comparative Embodiment 4 | Comparative Embodiment 5 |
|---|---|---|---|---|---|---|
| | material | fireproof material | fireproof material | fireproof material | commercially available PU foam heat insulation material | commercially available air-gel fireproof material |
| Process parameters | amount of oxidized fiber (g) | 50 | 85 | 5 | — | — |
| | length of oxidized fiber (μm) | 51 | 51 | 51 | — | — |
| | diameter of oxidized fiber (μm) | 2 | 2 | 2 | — | — |
| | amount of silicate fiber (g) | 40 | 5 | 85 | — | — |
| | length of silicate fiber (μm) | 52 | 52 | 52 | — | — |
| | diameter of silicate fiber (μm) | 10 | 10 | 10 | — | — |
| | amount of ceramic fiber (g) | 10 | 10 | 10 | — | — |
| | length of ceramic fiber (μm) | 52 | 52 | 52 | — | — |
| | diameter of ceramic fiber (μm) | 12 | 12 | 12 | — | — |
| | stacked layer number of mesh structures (layers) | 10 | 10 | 10 | — | — |
| | needle pitch of card clothing roll (μm) | 15 | 15 | 15 | — | — |
| | needle density (needles per inch) | 200 | 530 | 530 | — | — |
| Test Results | thickness (mm) | 0.85 | 0.85 | 0.85 | — | — |
| | density (g/cm³) | 0.235 | 0.15 | 0.15 | — | — |
| | thermal conductivity (W/m · K) | 0.030 | 0.047 | 0.047 | — | — |
| | fiber state | no breakage | no breakage | breakage | — | — |
| | refractoriness of fireproof material | not burned | burned | not burned | seriously burned | seriously burned |
| | evaluation of fireproof material when being used for lithium battery module | NG | NG | NG | NG | NG |

Results and Discussion

According to the above experimental results, the fiber states of the fireproof materials in Exemplary Embodiments 1 to 4 have no breakage. The fireproof materials are all not burned in the refractoriness test. The evaluations of the fireproof materials when being introduced into the lithium battery module are all deemed as "Pass".

The needle density of Comparative Embodiment 1 is 200 needles per inch, which is lower than an ideal needle density of 400 needles per inch. The thermal conductivity of the fireproof material of Comparative Embodiment 1 is lower than those of Exemplary Embodiments 1 to 4, and the evaluation of the fireproof material when being introduced into the lithium battery module is deemed as "NG".

In Comparative Embodiment 2, the amount of the oxidized fiber used is too high (i.e., 85 grams), and the amount of the silicate fiber used is too low (i.e., 5 grams), so that the fireproof material is burned in the refractoriness test, and the evaluation of the fireproof material when being introduced into the lithium battery module is deemed as "NG".

In Comparative Embodiment 3, the amount of the oxidized fiber used is too low (i.e., 5 grams), and the amount of the silicate fiber used is too high (i.e., 85 grams), so that the fiber state is broken, and the evaluation of the fireproof material when being introduced into the lithium battery module is deemed as "NG".

Both of Comparative Embodiments 4 and 5 adopt commercially available materials, which are all seriously burned in the test of refractoriness.

BENEFICIAL EFFECTS OF THE EMBODIMENTS

In conclusion, in the fireproof material used for the lithium battery module and the method for producing the same provided by the present disclosure, by virtue of "the first fibers (oxidized fibers) and the second fibers (silicate fibers) of the mesh structures" and "the specific stacked structure," the fireproof material can not only have high fire resistance, but also have lightweight properties, bendability, thinness, cushioning and vibration reduction, compressibility, no toxicity, no peculiar smell, and a low thermal conductivity. Accordingly, the fireproof material is suitable for use in the lithium battery module, especially in terminal fields for energy storage and power applications. In addition, the fireproof material can be quickly mass-produced through a roll-to-roll process, and thus has the advantage of low production costs.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A fireproof material used for a lithium battery module, characterized in that the fireproof material has a stacked structure formed by stacking multiple layers of mesh structures, and each layer of the mesh structures includes:

a first fibrous material including a plurality of first fibers, each of the first fibers being an oxidized fiber; wherein each of the first fibers has a first refractory temperature of between 800° C. and 900° C. a first thermal conductivity of between 0.14 W/(m·K) and 0.2 W/(m·K), a first fiber length of between 45 micrometers and 60 micrometers, and a first fiber diameter of between 1 micrometer and 5 micrometers; and a second fibrous material including a plurality of second fibers, each of the second fibers being a silicate fiber; wherein each of the second fil Berg has a second refractory temperature of between 950° C. and 1.050° C. a second thermal conductivity of between 0.03 W/(m·K) and 0.4 W/(m·K), a second fiber length of between 52 micrometers and 67 micrometers, and a second fiber diameter of between 8 micrometers and 12 micrometers;

wherein, based on a total weight of the fireproof material being 100 parts by weight, an amount of the first fibrous material is between 45 parts by weight and 60 parts by weight, and an amount of the second fibrous material is between 35 parts by weight and 45 parts by weight;

wherein, in each layer of the mesh structures, the plurality of first fibers are interwoven with the plurality of second fibers; wherein the multiple layers of the mesh structures of the fireproof material have a stacked layer number of between 5 layers and 20 layers, and a stacked layer thickness of between 0.3 mm and 5 mm;

wherein the fireproof material has an overall density of between 0.05 g/cm³ and 2 g/cm³ and an overall thermal conductivity of between 0.01 W/(m·K) and 0.8 W/(m·K).

2. The fireproof material according to claim 1, structures further includes:

a third fibrous material interwoven with the first fibrous material and the second fibrous material;

wherein the third fibrous material includes a plurality of third fibers, and each of the third fibers is a ceramic fiber, wherein each of the third fibers has a third refractory temperature of between 1,050° C. and 1,150° C., a third thermal conductivity of between 0.05 W/(m·K) and 0.5 W/(m·K), a third fiber length of between 45 micrometers and 55 micrometers, and a third fiber diameter of between 10 micrometers and 14 micrometers;

wherein, based on the total weight of the fireproof material being 100 parts by weight, an amount of the third fibrous material is between 3 parts by weight and 18 parts by weight.

3. The fireproof material according to claim 1, wherein the multiple layers of the mesh structures of the fireproof material have the stacked layer number of between 8 layers and 16 layers, and the stacked layer thickness of between 0.5 mm and 4 mm; wherein the fireproof material has the overall density of between 0.1 g/cm³ and 1.2 g/cm³ and the overall thermal conductivity of between 0.03 W/(m·K) and 0.5 W/(m·K).

* * * * *